United States Patent
Zahalka

(10) Patent No.: US 9,127,144 B2
(45) Date of Patent: Sep. 8, 2015

(54) POLYOLEFIN COMPOSITIONS FOR FILM, FIBER AND MOLDED ARTICLES

(71) Applicant: Addivant USA LLC, Middlebury, CT (US)

(72) Inventor: Hayder Zahalka, Morgantown, WV (US)

(73) Assignee: Addivant USA LLC, Danbury, CT (US)

( * ) Notice: Subject to any disclaimer, the term of this patent is extended or adjusted under 35 U.S.C. 154(b) by 52 days.

(21) Appl. No.: 13/741,504

(22) Filed: Jan. 15, 2013

(65) Prior Publication Data

US 2013/0190434 A1    Jul. 25, 2013

Related U.S. Application Data

(60) Provisional application No. 61/588,828, filed on Jan. 20, 2012, provisional application No. 61/593,401, filed on Feb. 1, 2012.

(51) Int. Cl.
*C08K 5/524* (2006.01)
*C08K 5/13* (2006.01)
*C08K 5/526* (2006.01)

(52) U.S. Cl.
CPC . *C08K 5/524* (2013.01); *C08K 5/13* (2013.01); *C08K 5/526* (2013.01)

(58) Field of Classification Search
USPC .......................................... 524/151; 264/540
See application file for complete search history.

(56) References Cited

U.S. PATENT DOCUMENTS 8,008,385 B2 *   8/2011   Hill et al. ...................... 524/150

FOREIGN PATENT DOCUMENTS

| WO | 03/044083 A1 | 5/2003 |
| WO | WO 03/044083 A1 * | 5/2003 |
| WO | 2007/149143 A2 | 12/2007 |
| WO | WO 2007/149143 * | 12/2007 |
| WO | WO 2007/149743 * | 12/2007 |

OTHER PUBLICATIONS

European Patent Office as International Searching Authority, International Search Report for PCT/US2013/022044, May 13, 2013 (3 pages).
European Patent Office as International Searching Authority, International Preliminary Report on Patentability and Written Opinion for PCT/US2013/022044, Jul. 22, 2014 (8 pages).

* cited by examiner

*Primary Examiner* — Robert Harlan
(74) *Attorney, Agent, or Firm* — D'Hue Law LLC; Cedric A. D'Hue

(57) ABSTRACT

Polyolefin compositions prepared by processing a polyolefin resin and a mixture of a select hindered phenol and select liquid phosphite above the melting point of the polyolefin contain a higher amount of retained active phosphorus than when other common phosphites are used. The compositions, and films, fibers and other molded articles prepared from the compositions show improved stabilization against NOX discoloration and long term oxidation. The select liquid phosphite consists mainly of a mixture of triphenyl phosphite derivatives wherein the phenyl groups are substituted by different numbers of butyl and/or amyl substituents.

12 Claims, No Drawings

POLYOLEFIN COMPOSITIONS FOR FILM, FIBER AND MOLDED ARTICLES

This application claims benefit under 35 USC 119(e) of U.S. provisional applications No. 61/588,828, filed Jan. 20, 2012, and 61/593,401, filed Feb. 1, 2012, the disclosures of which are incorporated herein by reference.

A polyolefin composition, e.g., a polyethylene composition, stabilized against thermal decomposition using an antioxidant composition containing a combination of hindered phenol and a select liquid phosphite stabilizer is provided, which composition is well suited for demanding application such as film and fiber manufacture, as the composition, comprising in particular the select liquid phosphite stabilizer, exhibits superior stability during processing at elevated temperatures while maintaining a higher level of active antioxidant phosphorus relative to other commercial phosphites, thus providing for improved post processing protection against NOX discoloration and long term oxidation.

BACKGROUND

Polymers are susceptible to thermal oxidative degradation. This problem is acute during processing at elevated temperatures and/or high shear, but long term, post processing stabilization is also required for many polymeric articles. A variety of compounds and strategies to combat a variety of polymer degradation issues have been developed, and stabilizers such as phenolic antioxidants, hindered amine light stabilizers, ultraviolet light absorbers, organophosphites, antioxidants, metal salts of fatty acids, hydrotalcites, metal oxides, epoxidized oils, hydroxylamines, amine oxides, lactones, and thiosynergists are common commercial entities. In order stabilizers to be effective in the final composition or article, they must survive processing in a concentration sufficient for activity.

It must also be remembered that often a thermoplastic polymer resin will encounter more than one high temperature processing step before formation of the final article. For example, a resin may be extruded at high temperature to fully incorporate the stabilizers and then formed into particles, pellets, etc being further exposed to high temperatures during formation of the final article, e.g., during molding, film formation or fiber spinning. Decomposition and other loss of antioxidants during high temperature processing is common and consideration must often given to whether adequate stabilization has been provided to not only provide protection for all of the processing steps, but also to meet any post processing stabilization needs of the final article. Of course one could add antioxidants prior to high temperature step in a multi step manufacturing process, but this is not ideal. Further manufacturers may purchase polymer feedstocks that already contain thermal stabilizers and often would prefer to not add additional antioxidants during processing to form the final article.

Stabilization strategies for various polyolefin resins, e.g., polypropylene, polyethylene and olefin co-polymers, depend on the specific type of resin, for example, various polyethylene resins include HDPE, LDPE, LLDPE, etc., manufacturing process, gas-phase, slurry, solution etc., and catalyst Ziegler-Natta, Chromium, metallocene, etc., used in the polymer production. The end use of the resin also plays a role in selecting the appropriate stabilization protocol.

For example, the manufacture of certain polymeric articles, such as films and fibers, often require the use of severe processing conditions. Many articles may have other performance needs requiring specially formulated stabilizer packages. Certain molded articles, such as polyethylene pipes, are formed under demanding conditions and then subjected to extreme conditions placing high demands on the physical integrity of the polymer composition.

Organophosphites, often in combination with hindered phenols, are used broadly in the stabilization of polyolefins as non-discoloring antioxidants during melt processing, fabrication, and long term applications. Commonly used phosphites include tris-nonylphenyl phosphite (TNPP) and tris(2,4-di-t-butylphenyl)phosphite; Commonly used sterically hindered phenols include and 2,6-di-t-butyl-4-ethyl-phenol and 3,5-bis(1,1-dimethylethyl)-4-hydroxy-benzenepropanoic acid derivatives such as tetrakismethylene (3,5-di-t-butyl-4-hydroxylhydrocinnamate)methane and octyl-3-(3,5-di-t-butyl-4-hydroxyphenyl)propionate.

TNPP and tris(2,4-di-t-butylphenyl)phosphite are commonly used in conjunction with, e.g., octyl-3-(3,5-di-t-butyl-4-hydroxyphenyl)propionate for melt stabilization of polyethylene. However, combinations of many phosphites with octyl-3-(3,5-di-t-butyl-4-hydroxyphenyl)propionate exhibit poor gas fading and high gel content when incorporated in polyethylene resins, which render these stabilizers unsuitable for film applications.

U.S. Pat. No. 8,188,170, incorporated herein by reference, discloses that processing polyethylene in the presence of a combination of phosphite stabilizers and select phenols, e.g., 1,3,5-tris-(4-tert-butyl-3-hydroxy-2,6-dimethylbenzyl)isocyanurate, 1,3,5-tris-(3,5-dicyclohexyl-4-hydroxybenzyl) isocyanurate, 1,3,5-tris-(3,5-di-tert-butyl-4-hydroxybenzyl) isocyanurate, 1,3,5-tris(4-t-butyl-3-hydroxy-2,6-dimethylbenzyl)-1,3,5-Triazine-2,4,6-(-1H,3H,5H)-trione, and 1,3,5-tris-(3,5-di-tert-butyl-4-hydroxybenzyl)-2,4,6-trimethylbenzene produces a polyethylene resin with low gel content and enhanced resistance to gas-fading well suited for film formation. Liquid phosphites are preferred in US 20100197837, as they are typically more readily processed and/or considered to be more compatible with the resin. In certain instances, better results are achieved with liquid phosphites.

U.S. Pat. No. 7,468,410 discloses a liquid phosphite stabilizer which is a mixture or tris-(mono-alkyl)phenyl phosphite esters. The liquid phosphite of U.S. Pat. No. 7,468,410 provides improved processing and gas-fading activity in linear low density polyethylene formulations vs the solid tris(2,4-di-t-butylphenyl)phosphite.

As mentioned above, the manufacture of polyolefin films presents specific challenges. These films include biaxially-oriented, blown polyolefin films used in the production of garbage bags, shopping bags, food wraps, and any number of articles requiring polymer chain orientation in both the machine direction (MD) and the transverse direction (TD) of the film. Both cast films and blown films are known having the requisite biaxial-orientation with good mechanical properties, namely tensile strength, elastic modulus, and impact resistance, in both the machine and transverse directions.

However, a polyethylene melt which has little long chain branching and narrow rheological breadth tends to form an unstable film bubble which can be described as bubble breathing (vertical movement of the neck as a function of time), dancing (circular rotation of the bubble around the axis formed by the die center), or other movement relative to the die which is random in nature. These instabilities cause poor gauge distribution (i.e., variations in film thickness) and may also result in process interruptions that will generally lead to a reduction of the quantity of acceptable film that is produced. This problem can be exacerbated by the presence of phenols and phosphites.

U.S. Pat. No. 6,930,137 overcomes this problem in blown polyethylene films by formulating with a lower amount of antioxidants than typically employed. i.e., less phenolic and, especially, less phosphite antioxidants. While this may aid in the formation of films with desired physical properties, the reduction in antioxidant level will mean that there is less stabilizer to protect the film during use.

U.S. Pat. No. 6,022,916 details some of the problems associated with forming films via melt extrusion, for example, complications arising from incompatible materials, such as filters clogged by solid materials, more common with solid phosphites such as tris(2,4-di-t-butylphenyl)phosphite. Issues related to exudation of formulation components and processing byproducts can also force the shutdown of productions lines for cleaning.

U.S. Pat. No. 4,600,633, incorporated herein by reference, and EP 0278569 discuss methods for preparing cast films, e.g., HDPE cast films. Such films can be prepared by stretching a gel sheet, i.e., a composition comprising polymer and a solvent, at elevated temperatures and temperatures of 250° C. and higher are often encountered. Cast films are also prepared by high temperature extrusion, typically followed by rolling on one or more cooling rolls, and processing temperatures of 280° C. may be encountered.

HDPE pipe can be solid wall or a layered structure such as profile pipe which has a thinner inner lining and an exterior shell. Pipes are typically prepared using an extrusion process; fittings pipes are often prepared injection molding. In use conditions for many pipe applications require strength and non-leaching characteristics among other performance criteria requiring care in stabilizer selection.

It is well known in the art that antioxidant action of phosphite stabilizers leads to decomposition of the phosphite. However, the first formed decomposition products often have antioxidant activity, but again, the antioxidant activity of these decomposition products is also associated with further decomposition of stabilizer, and between decomposition and hydrolysis, the amount of active phosphite additive in the polymer is ultimately exhausted. Nonetheless, when considering the long term effectiveness of a phosphite stabilizer, one should take into account both the amount of original phosphite species that remains as well as the amount of the phosphorus containing byproducts that also have antioxidant activity. The amount of phosphorus present in a composition in any species having antioxidant activity, whether the originally added phosphite or other active decomposition products thereof, can be referred to as active phosphorus.

U.S. Pat. No. 7,888,414, incorporated herein by reference, provides a liquid phosphite stabilizer, useful as a processing stabilizer for polyolefins, which consists essentially of a mixture of phosphite compounds that are generally solid when individually present at room temperature. For example, certain mixtures of tris 4-tert-butyl phenyl phosphite, tris 2,4-di-tert-butyl phenyl phosphite, bis(4-tert-butylphenyl)-2,4-di-tert-butylphenyl phosphite, and bis(2,4-di-tert-butylphenyl)-4-tert-butylphenyl phosphite are shown to be liquid at room temperature as are certain mixtures of tris 4-tert-pentyl phenyl phosphite, tris 2,4-di-tert-pentyl phenyl phosphite, bis(4-tert-pentylphenyl)-2,4-di-tert-pentylphenyl phosphite, and bis(2,4-di-tert-pentylphenyl)-4-tert-pentylphenyl phosphite.

It has been found that liquid phosphites according to U.S. Pat. No. 7,888,414, and related U.S. Pat. Nos. 8,008,383; 8,008,384, and 8,178,005 have surprising benefits relative to other phosphites, including other liquid phosphites, in polyolefin compositions useful in fiber and film formation and other demanding applications such as pipe. The liquid phosphite often contains an additive, such as a hydroxyalkylamine, to prevent hydrolysis as in U.S. Pat. No. 8,048,946. Surprisingly, these liquid phosphites are as active, or more active, than other phosphites in polyolefin compositions during, e.g., high temperature extrusion or long term use, even while retaining a higher amount of retained active phosphorus.

SUMMARY OF THE INVENTION

Stabilized compositions of the invention are prepared by processing, for example by extruding, a mixture comprising a polyolefin, for example a polyethylene polymer or copolymer, and an antioxidant composition comprising a select hindered phenol and select liquid phosphite in a 1:1 to 1:10 weight ratio of phenol to phosphite, at a temperature above the melting point of the polyolefin, wherein the liquid phosphite comprises a mixture consisting of from 0 to 20 weight percent based on the total weight of the phosphite of a tris(diamylaryl)phosphite or tris(dibutylaryl)phosphite;

from 20 to 75 weight percent based on the total weight of the phosphite of a tris(monoamylaryl)phosphite or tris(monobutylaryl)phosphite;

from 2 to 20 weight percent based on the total weight of the phosphite of a bis(diamylaryl)monoamylaryl phosphite or a bis(dibutylaryl)monobutylaryl phosphite; and from 15 to 60 weight percent based on the total weight of the phosphite of a bis(monoamylaryl)diamylaryl phosphite or a bis(monobutylaryl)dibutylaryl phosphite.

and wherein the above liquid phosphite mixture makes up at least 90 wt % of all phosphites present in the composition.

The stabilized composition thus prepared exhibits superior processing characteristics, excellent gas fade resistance, and retains a greater amount of active phosphorus material after processing, i.e., active antioxidant phosphorus compounds, than is retained when using other phosphite stabilizers. The composition is well suited for further high temperature processing and may be directly processed into films, e.g., by blowing, casting, extruding, co-extruding; fibers, e.g. by spinning; or other molded articles, or collected for transfer, shipping or storage etc, prior to final processing into a finished article.

The invention therefore relates to the composition prepared by processing the above polyolefin antioxidant mixture, a film, fiber or other molded article comprising the composition, the process for making the composition and the process for forming the film, fiber or other molded article with the composition.

DESCRIPTION OF THE INVENTION

One embodiment of the invention provides a stabilized polyolefin composition useful for film or fiber formation prepared by processing, i.e., by extruding, a mixture comprising a polyolefin and antioxidant composition at temperatures above the melting point of the polyolefin, wherein the antioxidant composition comprises a combination of hindered phenol and liquid phosphite in a weight ratio of hindered phenol to phosphite of about 1:1 to about 1:10 and is present in said mixture before processing at a concentration of from about 0.01 wt % to about 8 wt %, based on the combined weight of polyolefin plus antioxidant composition, and wherein after processing at temperatures above the melting point of the polyolefin, the stabilized polyolefin composition comprises greater than 30% retained active phosphorus based on the active phosphorus of the mixture comprising the polyolefin and antioxidant composition prior to processing, wherein said phenol is selected from the group consisting of compounds of formula I

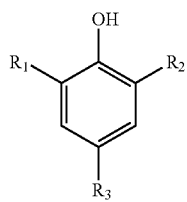

I wherein $R_1$ is $C_{1-18}$ alkyl, $C_{5-12}$ cyclic alkyl, phenyl, styryl, cumyl or H,
$R_2$ is $C_{1-18}$ alkyl, $C_{5-12}$ cyclic alkyl, phenyl, styryl, cumyl, or a group

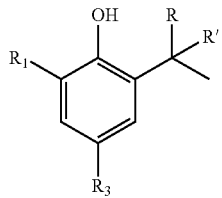

wherein R and R' are independently selected from H, methyl, ethyl or propyl,
$R_3$ is $C_{1-18}$ alkyl, $C_{5-12}$ cyclic alkyl, styryl, cumyl, H or a group —CH$_2$CH$_2$COOR" wherein R" is a $C_{1-18}$ alkyl or a group

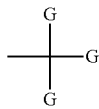

wherein 1, 2 or 3 G groups are 3,5-bis(1,1-dimethylethyl)-4-hydroxy-benzenepropanoyl and the remaining G groups are independently H or $C_{1-4}$ alkyl;
and said liquid phosphite comprises a mixture consisting of:
from 0 to 20 weight percent based on the total weight of phosphite of a tris(diamylphenyl)phosphite or tris(dibutylphenyl)phosphite;
from 20 to 75 weight percent based on the total weight of the phosphite of a tris(monoamylphenyl)phosphite or tris(monobutylphenyl)phosphite;
from 2 to 20 weight percent based on the total weight of the phosphite of a bis(diamylphenyl)monoamylphenyl phosphite or a bis(dibutylphenyl)monobutylphenyl phosphite; and
from 15 to 60 weight percent based on the total weight of the phosphite of a bis(monoamylphenyl)diamylphenyl phosphite or a bis(monobutylphenyl)dibutylphenyl phosphite,
which liquid phosphite makes up at least 90% by weight of all phosphites present in the composition before processing.

Often the phenol/liquid phosphite antioxidant composition is present in the mixture being processed in an amount of from about 0.2 wt % to about 5 wt %, based on the total weight of the mixture, for example, amounts of up to 4 wt % are encountered, often 3 wt % or 2 wt % or less are used. Generally at least 0.1 wt percent is present, for example 0.5 wt %, 1 wt % or more.

The weight ratio of phenol to phosphite is from about 1:1 to about 1:10 phenol to phosphite, typically, there is more phosphite than phenol, for example, a weight ratio of from about 1:1.5 to about 1:8, for example, a weight ratio of 1:2, 1:3, 1:4, 1:5 or fractional amounts in between are employed.

The polyolefin is for example, polypropylene, polyethylene (which optionally can be crosslinked), for example high density polyethylene (HDPE), low density polyethylene (LDPE) and linear low density polyethylene (LLDPE), mixtures comprising these polymers, for example, mixtures of polypropylene with polyisobutylene, polypropylene with polyethylene (for example PP/HDPE, PP/LDPE) and mixtures of different types of polyethylene (for example LDPE/HDPE), or ethylene or propylene copolymers for example ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, and terpolymers of ethylene with propylene and a diene, such as hexadiene, dicyclopentadiene or ethylidene-norbornene. The polyolefin of the invention may also be cross-linked.

For example the polymer is an ethylene or propylene polymer or copolymer, often a polyethylene, e.g., high density polyethylene (HDPE), low density polyethylene (LDPE) or linear low density polyethylene (LLDPE).

At least 90 wt % of the liquid phosphite of the invention consists of a mixture of:
from 0 to 20 weight percent based on the total weight of the phosphite of a tris(diamylphenyl)phosphite or tris(dibutylphenyl)phosphite;
from 20 to 75 weight percent based on the total weight of the phosphite of a tris(monoamylphenyl)phosphite or tris(monobutylphenyl)phosphite;
from 2 to 20 weight percent based on the total weight of the phosphite of a bis(diamylphenyl)monoamylphenyl phosphite or a bis(dibutylphenyl)monobutylphenyl phosphite; and
from 15 to 60 weight percent based on the total weight of the phosphite of a bis(monoamylphenyl)diamylphenyl phosphite or a bis(monobutylphenyl)dibutylphenyl phosphite:
for example, 90 wt % of the liquid phosphite of the invention consists of a mixture of
from 0 to 20 weight percent based on the total weight of the phosphite of a tris(diamylphenyl)phosphite, for example tris(di-tert-amylphenyl)phosphite;
from 20 to 70 weight percent based on the total weight of the phosphite of a tris(monoamylphenyl)phosphite, for example, tris(mono-tert-amylphenyl)phosphite;
from 2 to 20 weight percent based on the total weight of the phosphite of a bis(diamylphenyl)monoamylphenyl phosphite, for example bis(di-tert-amylphenyl)mono-tert-amylphenyl phosphite; and
from 15 to 60 weight percent based on the total weight of the phosphite of a bis(monoamylphenyl)diamylphenyl phosphite, for example bis(mono-tert-amylphenyl)di-tert-amylphenyl phosphite;
or, for example:
from 0 to 3 weight percent based on the total weight of phosphite of a tris(dibutylphenyl)phosphite, for example, tris(di-tert-butylphenyl)phosphite;
from 35 to 75 weight percent based on the total weight of the phosphite of a tris(monobutylphenyl)phosphite, for example, tris(mono-tert-butylphenyl)phosphite;

from 5 to 15 weight percent based on the total weight of the phosphite of a bis(dibutylphenyl)monobutylphenyl phosphite, for example, bis(di-tert-butylphenyl)mono-tert-butylphenyl phosphite; and from 21 to 47 weight percent based on the total weight of the phosphite of a bis(monobutylphenyl)dibutylphenyl phosphite, for example, bis(mono-tert-butylphenyl)di-tert-butylphenyl phosphite.

The vast majority, more than 75%, often more than 90% or 95%, of the butyl and amyl substituents on the phenyl ring in the above phosphites are in the ortho or para position relative to the Phenyl-O-Phosphorus bond.

The liquid phosphites of the invention are liquid at a temperature of 25° C., and are generally more compatible with polyolefins such as polyethylene than solid phosphites. For example, the instant phosphite mixtures can be used at concentrations above which tris(2,4-di-t-butylphenyl)phosphite, when used as the sole or predominate phosphite, exudes from polyethylene compositions. While a small amount of other phosphites may be present, at least 90%, for example 95% or 98% of all phosphites are those of the above defined mixtures.

Polyolefins compositions containing the phosphites of the invention, for example, polyethylene compositions of the invention, demonstrate better melt processing behavior than similar compositions which use other liquid phosphites, such as TNPP. For example, when used at the same concentration in polyethylene formulations containing low amounts of phenol antioxidant, the liquid phosphite of the invention provides better melt flow characteristics than TNPP.

Better protection against gas fading (coloration caused by NOX gasses) is also observed with the phosphite of the invention compared with other phosphites, e.g., TNPP, at either high or low load phenol loadings.

Despite the superior activity of the present phosphite vs TNPP in polyethylene processing, a greater amount of stabilizing phosphorus materials are extracted from the compositions of the invention after extrusion than when TNPP is used. This is surprising at least in part because phosphites are typically transformed in use, ultimately to non-active species. Thus, if the lower antioxidant concentrations recommended by U.S. Pat. No. 6,930,137 are used to prepare the compositions as described above, the instant compositions will have a higher level of phosphorus containing antioxidant after processing than compositions using many other phosphites.

Another advantage of using the phosphites of the invention is that excellent gas-fading protection can be obtained when using phenols other than those recommended in US Pub Pat Appl. 20100197837. For example, the invention allows one to use phenols such as 3,5-bis(1,1-dimethylethyl)-4-hydroxy-benzenepropanoic acid derivatives including tetrakismethylene (3,5-di-t-butyl-4-hydroxylhydrocinnamate)methane and octyl-3-(3,5-di-t-butyl-4-hydroxyphenyl)propionate can be used as the phenolic antioxidant.

For example, the phenol of the invention includes compounds of formula I as defined above, in other embodiments the phenol is a compound of formula I

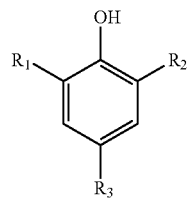

wherein $R_1$ and $R_2$ are independently $C_{1-8}$ alkyl, e.g., $C_{1-4}$ alkyl, e.g., methyl, sec-butyl or tert-butyl, often $R_1$ and $R_2$ are each t-butyl;

and $R_3$ is $C_{1-8}$ alkyl, e.g., $C_{1-4}$ alkyl, e.g., methyl, sec-butyl or tert-butyl, or a group —$CH_2CH_2COOR''$, wherein R" is $C_{1-18}$ alkyl or a group

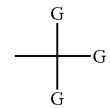

wherein all G groups are 3,5-bis(1,1-dimethylethyl)-4-hydroxy-benzenepropanoyl.

For example, phenolic antioxidants of the invention include, but are not limited to, 2,6-di-t-butyl-p-cresol, 2,6-diphenyl-4-octadecyloxyphenol, stearyl(3,5-di-t-butyl-4-hydroxyphenyl)-propionate, hexamethylene-bis(3,5-di-t-butyl-4-hydroxyphenylpropionate, 2,2'-methylenebis(4-methyl-6-t-butylphenol), 2,2'-methylenebis(4-ethyl-6-t-butylphenol), 4,4'-butylidenebis (6-t-butyl-m-cresol), 2,2'-ethylidenebis(4,6-di-t-butylphenol), 2,2'-ethylidenebis(4-sec-butyl-6-t-butylphenol), 3,6-dioxaoctylenebis(3-methyl-5-t-butyl-4-hydroxyphenylpropionate) and tetrakis(methylene-3-(3,5-di-t-butyl-4-hydroxyphenyl)-propionate)methane.

Other known phenolic antioxidants may also be present, including for example, thio-diethylenebis(3,5-di-t-butyl-4-hydroxyphenylpropionate, but at least 90% of all phenols of in the inventive composition are those of formula I.

Polyethylene compositions of the invention containing a blend of the present liquid phosphite and phenols such as octyl-3-(3,5-di-t-butyl-4-hydroxyphenyl)propionate can be prepared without the drawbacks seen with many other phosphites, i.e., the poor gas fading and high gel content seen with other phosphites and this phenol are not encountered in PE compositions of the present invention, making them highly suitable for film applications.

The polymer compositions of the invention may obviously also contain various conventional additives, such as processing aids, thiosynergists, light stabilizers, thermal stabilizers other than phosphites and the above phenols, colorants, optical brighteners, metal deactivators, basic stabilizers such as metal salts and clays such as metal stearates, kaolin or DHT-4, nucleating agents, fillers, reinforcing agents, anti stats, blowing agents, flame retardants and the like.

For example, metal salts of carboxylic acids, such as $C_{8-24}$ carboxylic acids and metal salts of lactic acids, for example, calcium stearate or functional equivalent thereof, are typically used in processing polyolefins, especially if residual catalyst needs to be deactivated, and these additives are generally present in the inventive compositions.

Another embodiment of the invention provides an improvement in the process for preparing a stabilized polyolefin composition useful for film and fiber, which process comprises processing a mixture comprising a polyolefin and antioxidant composition comprising a combination of hindered phenol and phosphite at temperatures above the melting point of the polyolefin, the improvement being addition of the above select liquid phosphite as the phosphite of the antioxidant composition to obtain after processing at temperatures above the melting point of the polyolefin to obtain the stabilized polyolefin composition having greater than 30%, 35%, 40% or 50% retained active phosphorus based on the active phosphorus of the mixture comprising the polyolefin and antioxidant composition prior to processing.

Typically, the improved process uses as hindered phenol one or more compounds of formula I above in the amounts and proportions as described above. The term processing refers to any common step preformed in the formation and manipulation of polymer compositions such as extrusion, co-extrusion, melt mixing, molding, etc.

Depending on processing conditions, e.g., temperature, time, shear etc, the amount of retained active phosphorus will vary. For example, the conditions often encountered in a small laboratory scale extruder, for example, a 19 mm diameter Brabender single-screw extruder are less harsh relative to oxidation than those encountered in large scale industrial extruders. The use of multiple passes through a small laboratory extruder can be used to give a better representation of harsh industrial extrusion conditions or several separate high temperature processing steps a polymer composition is exposed to during compounding and final article production.

Reference herein to "greater than 30% retained active phosphorus" in the inventive stabilized composition relates most closely to the amount of antioxidatively active phosphorus present, based on the amount originally added via the select liquid phosphite, after multiple extrusions on a lab scale extruder, for example, after 5 extrusion runs at 230° C. using a single screw extruder as shown in the examples. However, as also seen in the examples, higher amounts of retained active phosphorus can be obtained depending on the exact polymer used or shortened exposure to high temperature and shear as seen after only 3 extrusion runs, etc. While in some embodiments retained active phosphorus content exceeds 30 wt %, in other embodiments retained active phosphorus content exceeds 35 wt %, 40 wt % or 50 wt %. Significantly, in the polyolefin resins tested, the amount of active phosphorus retained after high temperature processing is higher for the liquid phosphite of the invention than when the liquid TNPP, i.e., tris-nonylphenyl phosphite, or the solid tris(2,4-di-t-butylphenyl)phosphite is used.

The amount of retained active phosphorus present in the composition or article can be obtained by a variety of known methods. Typically, the composition is thoroughly extracted and the extracts analyzed by spectral or chromatographic methods to determine the amounts of antioxidant phosphorus species present. The extracts could also be assayed using chemical means by for example testing the ability of extracted phosphorus containing materials to decompose peroxides or hydrogen peroxides.

The polyolefin resin compositions produced by the invention typically comprise from 50 to 99.9 weight % polyolefin resin, generally from 80 to 99.9 weight % or 90 to 99.5 weight %, typically from 95 to 99 weight % thereof based on the total weight of the composition; from 0.01 to 5 weight % phosphite, generally 0.1 to 3 weight %, often from 0.5 to 2 weight % thereof based on the total weight of the composition.

The polymer compositions of the invention are useful in many demanding processing methods, e.g., sheet and fiber extrusion, co-extrusion and extrusion and injection molding to form pipes and pipe fittings, as well as blow molding, injection molding and rotary molding. Films formed using the compositions of the invention include blown films, cast films extruded or coextruded films and other laminates, films useful as shrink film, cling film, stretch film, sealing films, oriented films, snack packaging, heavy duty bags, grocery sacks, general purpose bags, carrier bags, food packaging films, baked and frozen food packaging, agriculture films, medical packaging, industrial liners, or membranes, in food-contact or non-food contact applications. Fibers, such as those prepared by melt spinning, solution spinning and melt blown fiber operations, are used in woven or non-woven form to make filters, diaper fabrics, medical garments, geotextiles, etc. Extruded articles include, for example, medical tubing, wire and cable coatings, geomembranes, and pond liners. Molded articles include single and multi-layered constructions in the form of bottles, tanks, large hollow articles, rigid food containers and toys, etc.

In all these operations, the characteristics and/or properties of the inventive polymeric composition, for example, color stability, e.g., as measured by yellowing index, gel content, melt flow index, and oxygen induction time, are excellent and generally improved relative to many other similar compositions. In addition, unlike solid phosphite compositions, liquid phosphite compositions beneficially may be incorporated into polymeric compositions without melting.

In terms of improving color, the present invention provide improved resistance to discoloration from gas fading, as set forth by AATCC 23 at a temperature of 60 C. Oxides of nitrogen (NOx) in the atmosphere, caused by pollutants, can react with the stabilizers, especially phenolic stabilizers, to trigger discoloration which increases as the exposure time increase. The yellowness index, measured by ASTM D1925, of the polymer stabilized with the stabilizers of the present invention demonstrates a value at 7 days of exposure to NOx of less than 0, e.g., less than −0.5 or less than −0.9; at 18 days of less than 0.7, e.g., less than 0.1 or less than −0.3; at 25 days of less than 1.2, e.g., less than 1.1 or less than 1; at 33 days of less than 1.8, e.g., less than 1.7 or less than 1.65; and at 41 days of less than 3, e.g., less than 2.5 or less than 2.4. This is a significant improvement over resins stabilized with conventional stabilizers.

Gel content may be measured by counting the number of 200 to 400 μm gel sized formations in a square meter of polymeric film. The polymers stabilized with stabilizers of the present invention preferably have a gel content of 200 to 400 μm gel sized formations ranging from 0.01 to 0.5 gel per square meter (gel/m$^2$) of film, e.g., from 0.05 to 0.45 gel/m$^2$, or from 0.1 to 0.42 gel/m$^2$. These gel contents obtained with the stabilizing compositions of the invention are significantly lower than those achieved using conventional stabilizers which typically have gel contents of greater than 1 gel/m$^2$, e.g., greater than 2 gel/m$^2$, or greater than 3 gel/m$^2$. In one embodiment, the polymers stabilized with the stabilizing compositions of the invention have no detectable gel size formations greater than 400 μm. Conventional stabilizers which typically have detectable amount of gel contents greater than 400 μm of less than 5 gel/m$^2$, e.g., less than 2 gel/m$^2$ or less than 0.5 gel/m$^2$.

EXAMPLES

Examples 1-4 compare a liquid phosphite of the invention to a commercial liquid phosphite in a composition prepared from m-LLDPE, an ethylene-hexene copolymer prepared using a metallocene catalyst and having a density of 0.918 g/cc and melt flow index of 0.6 to 1.0 g per 10 mins, and the following formulations:

Ex 1

500 ppm of octadecyl(4-hydroxy-3,5-di-tert-butyl-phenyl) propionate, and 1500 ppm of a liquid phosphite consisting essentially of 0 to 20 weight percent tris(di-tert-amylphenyl)phosphite;
20 to 70 weight percent tris(mono-tert-amylphenyl)phosphite;
2 to 20 weight percent bis(di-tert-amylphenyl)mono-tert-amylphenyl phosphite;

and 15 to 60 weight percent bis(mono-tert-amylphenyl)di-tert-amylphenyl phosphite;

Ex 2

500 ppm of octadecyl(4-hydroxy-3,5-di-tert-butyl-phenyl) propionate, and 1500 ppm of liquid phosphite TNPP;

Ex 3 approx 1000 ppm of octadecyl(4-hydroxy-3,5-di-tert-butyl-phenyl)propionate, and 1500 ppm of a liquid phosphite consisting essentially of 0 to 20 weight percent tris(di-tert-amylphenyl)phosphite;

20 to 70 weight percent tris(mono-tert-amylphenyl)phosphite;

2 to 20 weight percent bis(di-tert-amylphenyl)mono-tert-amylphenyl phosphite;

and 15 to 60 weight percent bis(mono-tert-amylphenyl)di-tert-amylphenyl phosphite;

Ex 4 approx 1000 ppm of octadecyl(4-hydroxy-3,5-di-tert-butyl-phenyl)propionate, and 1500 ppm of liquid phosphite TNPP.

The above examples 1-4, were compounded at 200° C. under nitrogen and extruded multiple times at 230° C. under air using a laboratory scale single screw extruder. After each pass individual samples of each composition were a) tested for melt flow, g/10 min b) tested for gas-fading performance, and c) extracted with methylene chloride which were analyzed by HPLC to determine the amounts of residual phosphite, and active phosphite oxidation and hydrolysis products.

Melt Flow Results

| Example | Melt Flow Index | | |
|---|---|---|---|
| | $1^{st}$ pass | $3^{rd}$ pass | $5^{th}$ pass |
| 1 | 3.60 | 3.55 | 3.50 |
| 2 | 3.55 | 3.52 | 3.32 |
| 3 | 3.60 | 3.60 | 3.55 |
| 4 | 3.60 | 3.62 | 3.55 |

Gas Fade Results

| Example | YI | | | |
|---|---|---|---|---|
| | 0 days | 7 days | 14 days | 21 days |
| 1 | −0.6 | −0.4 | −0.4 | −0.2 |
| 2 | −0.6 | −0.4 | −0.2 | 0.4 |
| 3 | −0.6 | −0.5 | −0.2 | 1.0 |
| 4 | −0.5 | −0.4 | 0.6 | 3.2 |

Extraction Results

Example 1 and 3, prepared using phosphites of the invention, retained after 5 extrusion passes, 3 times more active phosphite components than comparative examples 2 and 4.

| Example | Retained Active Phosphorus | |
|---|---|---|
| | $3^{rd}$ pass | $5^{th}$ pass |
| 1 | 58% | 32% |
| 2 | 35% | 10% |

Examples 5-8 compare formulations containing a liquid phosphite of the invention to formulations containing a commercial liquid phosphite in compositions made using a metallocene copolymer, i.e., m-LLDPE ethylene hexene copolymer resin; d=0.918; MFI (1-2)=3.5; and in compositions made using a Ziegler Natta catalyst, i.e., ZN-LLDPE ethylene-hexene copolymer resin, d=0.926; MFI (1-5)=1.8.

The following compositions were compounded, extruded and tested as in Example 1.

Ex 5 comprises the antioxidant formulation of Ex 1 and the m-LLDPE copolymer.

Ex 6 comprises the antioxidant formulation of Ex 2 and the m-LLDPE copolymer.

Ex 7 comprises the antioxidant formulation of Ex 1 and the ZN-LLDPE copolymer.

Ex 8 comprises the antioxidant formulation of Ex 2 and the ZN-LLDPE copolymer.

| Example | Retained Active Phosphorus | | Melt Flow Index | |
|---|---|---|---|---|
| | $3^{rd}$ pass | $5^{th}$ pass | $3^{rd}$ pass | $5^{th}$ pass |
| 5 | 54.8% | 31.0% | 3.6 | 3.6 |
| 6 | 32.2% | 8.8% | 3.6 | 3.6 |
| 7 | 55.8% | 41.8% | 1.8 | 1.9 |
| 8 | 36.4% | 17.4% | 1.8 | 1.9 |

Gas Fade Results

| Example | YI | | | | |
|---|---|---|---|---|---|
| | 0 days | 3 days | 7 days | 10 days | 14 days |
| 5 | −1.1 | −0.8 | −0.7 | −0.5 | −0.4 |
| 6 | −1.2 | −0.8 | −0.4 | 0.3 | 2.1 |

Example 9

The m-LLDPE of Example 1 was compounded and extruded 5 times according to the procedure above with:
500 ppm of a mixture of $C_{13-15}$ esters of (4-hydroxy-3,5-di-tert-butyl-phenyl)propionic acid, and
1500 ppm of a liquid phosphite consisting essentially of
    0 to 20 weight percent tris(di-tert-amylphenyl)phosphite;
    20 to 70 weight percent tris(mono-tert-amylphenyl)phosphite;

2 to 20 weight percent bis(di-tert-amylphenyl)mono-tert-amylphenyl phosphite; and 15 to 60 weight percent bis(mono-tert-amylphenyl)di-tert-amylphenyl phosphite;

Example 10

The process of Example 9 was repeated substituting 2,6-bis(alphamethylbenzyl)-4-methylphenol for the mixture of $C_{13-15}$ esters of (4-hydroxy-3,5-di-tert-butyl-phenyl)propionic acid.

Example 11

The m-LLDPE of Example 1 was compounded via extrusion with: 500 ppm of octadecyl(4-hydroxy-3,5-di-tert-butyl-phenyl)propionate, and 1500 tris(2,4-di-t-butylphenyl)phosphite.

Examples 9-11 were tested as above for melt flow, gas fade and retained active phosphorus. MFI for each sample was between 3.0 and 4.0 for each sample. Gas fade results for Examples 9 and 10, compositions of the invention, are compared with those for Example 11 in the table below.

Gas Fade Results

|    | YI     |        |         |         |
|----|--------|--------|---------|---------|
| Ex | 0 days | 8 days | 14 days | 21 days |
| 9  | −1.3   | 0.1    | 0.1     | 0.3     |
| 10 | −1.2   | 0.3    | 0.2     | 0.3     |
| 11 | −0.8   | 3.1    | 4.0     | 4.7     |

Extraction Results

|         | Retained Active Phosphorus | |
|---------|----------------------|----------------------|
| Example | 3<sup>rd</sup> pass  | 5<sup>th</sup> pass  |
| 9       | 58%                  | 32%                  |
| 11      | —                    | 12%                  |

What is claimed:

1. A stabilized polyolefin composition for film or fiber formation prepared by processing a mixture comprising a polyolefin and antioxidant composition at temperatures above the melting point of the polyolefin,
   wherein the antioxidant composition comprises a combination of hindered phenol and liquid phosphite in a weight ratio of hindered phenol to phosphite of about 1:1 to about 1:10 and is present in said mixture before processing at a concentration of from about 0.01 wt % to about 8 wt %, based on the combined weight of polyolefin plus antioxidant composition,
   and wherein after processing at temperatures above the melting point of the polyolefin the stabilized polyolefin composition comprises greater than 30% retained active phosphorus based on the active phosphorus of the mixture comprising the polyolefin and antioxidant composition prior to processing, wherein said phenol is selected from the group consisting of compounds of formula I

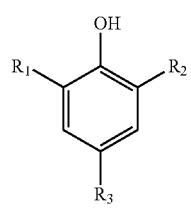

I wherein $R_1$ is $C_{1-18}$ alkyl, $C_{5-12}$ cyclic alkyl, phenyl, styryl, cumyl or H, $R_2$ is $C_{1-18}$ alkyl, $C_{5-12}$ cyclic alkyl, phenyl, styryl, cumyl, or a group

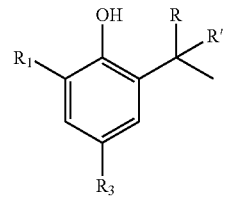

wherein R and R' are independently selected from H, methyl, ethyl or propyl, $R_3$ is $C_{1-18}$ alkyl, $C_{5-12}$ cyclic alkyl, styryl, cumyl, H or a group
—CH$_2$CH$_2$COOR"
wherein R" is a $C_{1-18}$ alkyl or a group

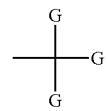

wherein 1, 2 or 3 G groups are 3,5-bis(1,1-dimethylethyl)-4-hydroxy-benzenepropanoyl and the remaining G groups are independently H or $C_{1-4}$ alkyl;
and said liquid phosphite comprises a mixture consisting of:
from 0 to 20 weight percent based on the total weight of phosphite of a tris(diamylphenyl)phosphite or tris(dibutylphenyl)phosphite;
from 20 to 75 weight percent based on the total weight of the phosphite of a tris(monoamylphenyl)phosphite or tris(monobutylphenyl)phosphite;
from 2 to 20 weight percent based on the total weight of the phosphite of a bis(diamylphenyl)monoamylphenyl phosphite or a bis(dibutylphenyl)monobutylphenyl phosphite;
and from 15 to 60 weight percent based on the total weight of the phosphite of a bis(monoamylphenyl)diamylphenyl phosphite or a bis(monobutylphenyl)dibutylphenyl phosphite,
which liquid phosphite makes up at least 90% by weight of all phosphites present in the composition before processing.

2. The composition according to claim 1 wherein the phenol is a compound of formula I wherein $R_1$ and $R_2$ are independently selected from $C_{1-4}$ alkyl, and $R_3$ is $C_{1-8}$ alkyl or a group
—CH$_2$CH$_2$COOR",
wherein R" is a $C_{1-18}$ alkyl or a group

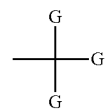

wherein each group G is 3,5-bis(1,1-dimethylethyl)-4-hydroxy-benzenepropanoyl.

3. A film or fiber prepared from a composition according to claim 1.

4. The composition according to claim 2 wherein said liquid phosphite comprises a mixture consisting of:
from 0 to 20 weight percent based on the total weight of phosphite of tris(di-t-amylphenyl)phosphite;
from 20 to 70 weight percent based on the total weight of the phosphite of tris(mono-t-amylphenyl)phosphite;
from 2 to 20 weight percent based on the total weight of the phosphite of bis(di-t-amylphenyl)mono-t-amylphenyl phosphite; and
from 15 to 60 weight percent based on the total weight of the phosphite of a bis(mono-t-amylphenyl)di-t-amylphenyl phosphite,
which mixture which is liquid at 25.degree. C. makes up at least 90% by weight of all phosphites present in the composition.

5. The composition according to claim 2 wherein said liquid phosphite comprises a mixture consisting of:
from 0 to 3 weight percent based on the total weight of phosphite of tris(di-t-butylphenyl)phosphite;
from 35 to 75 weight percent based on the total weight of the phosphite of tris(mono-t-butylphenyl)phosphite;
from 5 to 15 weight percent based on the total weight of the phosphite of bis(di-t-butylphenyl)monobutylphenyl phosphite; and
from 21 to 47 weight percent based on the total weight of the phosphite of bis(mono-t-butylphenyl)dibutylphenyl phosphite,
which mixture which is liquid at 25.degree. C. makes up at least 90% by weight of all phosphites present in the composition.

6. A film or fiber prepared from a composition according to claim 4.

7. A film or fiber prepared from a composition according to claim 5.

8. The stabilized composition of claim 1 wherein the polyolefin is a polyethylene polymer or copolymer.

9. The stabilized composition of claim 2 wherein the polyolefin is a polyethylene polymer or copolymer.

10. The film of claim 3 wherein the polyolefin in the composition is a polyethylene polymer or copolymer.

11. The film of claim 6 wherein the polyolefin in the composition is a polyethylene polymer or copolymer.

12. The film of claim 7 wherein the polyolefin in the composition is a polyethylene polymer or copolymer.

* * * * *